(12) United States Patent
Cao et al.

(10) Patent No.: US 10,993,135 B2
(45) Date of Patent: *Apr. 27, 2021

(54) SSID TO QCI MAPPING

(71) Applicant: Parallel Wireless, Inc., Nashua, NH (US)

(72) Inventors: Yang Cao, Westford, MA (US); Sumit Garg, Hudson, NH (US); Anand Bhaskarwar, Nashua, NH (US); Steven Beaudette, Nashua, NH (US); Mohit Chugh, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 204 days.

This patent is subject to a terminal disclaimer.

(21) Appl. No.: 16/174,976

(22) Filed: Oct. 30, 2018

(65) Prior Publication Data

US 2019/0075483 A1   Mar. 7, 2019

Related U.S. Application Data

(63) Continuation of application No. 15/187,762, filed on Jun. 20, 2016, now Pat. No. 10,206,138.

(60) Provisional application No. 62/181,325, filed on Jun. 18, 2015.

(51) Int. Cl.
| | | |
|---|---|---|
| H04W 28/24 | (2009.01) | |
| H04W 28/02 | (2009.01) | |
| H04L 29/06 | (2006.01) | |
| H04W 12/00 | (2021.01) | |
| H04W 12/02 | (2009.01) | |
| H04W 84/12 | (2009.01) | |

(52) U.S. Cl.
CPC ..... *H04W 28/0268* (2013.01); *H04L 63/0428* (2013.01); *H04W 12/0017* (2019.01); *H04W 12/02* (2013.01); *H04W 28/0247* (2013.01); *H04L 63/0272* (2013.01); *H04W 84/12* (2013.01)

(58) Field of Classification Search
CPC .......... H04L 63/0272; H04L 63/0428; H04W 12/02; H04W 28/0247; H04W 28/0268; H04W 84/12
See application file for complete search history.

(56) References Cited

U.S. PATENT DOCUMENTS

| | | | |
|---|---|---|---|
| 10,206,138 B2 * | 2/2019 | Cao | ................. H04W 12/02 |
| 2003/0221016 A1 | 11/2003 | Jouppi et al. | |
| 2014/0080447 A1 | 3/2014 | Janakiraman | |
| 2014/0376563 A1 | 12/2014 | Suryavanshi | |
| 2015/0110044 A1 | 4/2015 | Berzin et al. | |
| 2015/0304882 A1 | 10/2015 | Turanyi et al. | |

(Continued)

*Primary Examiner* — Asad M Nawaz
*Assistant Examiner* — Zhaohui Yang
(74) *Attorney, Agent, or Firm* — Michael Y. Saji; David W. Rouille

(57) ABSTRACT

Systems and methods are disclosed for assigning a quality of service to a data packet in a communications network by mapping a Wi-Fi access layer identifier such as an SSID to a value in a datagram header, and subsequently using the datagram header to assign an appropriate data bearer for the datagram, the data bearer having a quality of service class identifier appropriate for the type of traffic expected to be sent over the particular Wi-Fi access layer.

20 Claims, 5 Drawing Sheets

(56) References Cited

U.S. PATENT DOCUMENTS

2017/0086090 A1     3/2017   Sharma et al.
2017/0324652 A1    11/2017   Lee et al.

* cited by examiner

SSID TO QCI MAPPING

CROSS-REFERENCE TO RELATED APPLICATIONS

This application is a continuation of, and claims the benefit of an earlier filing date under 35 U.S.C. § 120 based on, U.S. patent application Ser. No. 15/187,762, having attorney docket no. PWS-71830US01, filed Jun. 20, 2016, and entitled "SSID to QCI Mapping", which itself claims the benefit of priority under 35 U.S.C. § 119(e) of U.S. Provisional Patent Application No. 62/181,325, filed on Jun. 18, 2015, which are each hereby incorporated by reference herein in its entirety for all purposes. Additionally, U.S. Pat. App. Pub. Nos. US20140086120, US20140092765, US20140133456, US20150045063, and US20150078167 are hereby incorporated by reference in their entirety for all purposes.

BACKGROUND

In a Wi-Fi to cellular (e.g., Long Term Evolution or LTE) bridging scenario, data traffic may start at a Wi-Fi access point and may be routed to cellular backhaul. Cellular networks enable different types of traffic to be handled with different quality levels of service. This is done with quality of service (QoS) identifiers associated with radio bearers, which are tunnels which encapsulate datagrams as they travel through the network to a packet gateway. In some cases, it is possible to identify the appropriate quality of service. For example, for unencrypted and unencapsulated data traffic, a protocol header may be visible for determining whether a datagram is for a real-time application such as real time protocol (RTP) or for a non-interactive application such as hypertext transfer protocol (HTTP). However, this is not an option for encapsulated or encrypted traffic. This is also not possible for data that is received at an evolved packet data gateway (ePDG) gateway for providing LTE core network access to Wi-Fi users, as such traffic is encapsulated in a tunnel.

LTE quality of service and the quality of service class indicator (QCI) are further described in 3GPP TS 23.203, "Policy and charging control architecture," which is hereby incorporated herein in its entirety.

Wi-Fi networks, such as those using the IEEE 802.11a/b/g/n/ac, etc. protocols, use a service set identifier (SSID) to identify a service set, or a set of nodes that are part of a particular wireless local area network. This identifier is sometimes commonly called the "network name." The SSID appears in the header of certain frames that are sent over a wireless local area network (WLAN). For further reference, the IEEE 802.11-2007 standard, "Part 11: Wireless LAN Medium Access Control (MAC) and Physical Layer (PHY) specifications" is hereby incorporated herein in its entirety.

SUMMARY

Systems and methods are disclosed for assigning a quality of service to a data packet in a communications network by mapping a Wi-Fi access layer identifier such as a service set identifier (SSID) to a value in a datagram header, and subsequently using the datagram header to assign a data bearer for the datagram, the data bearer having a quality of service class identifier appropriate for the type of traffic expected to be sent over the particular Wi-Fi access layer.

In a first embodiment, a base station may be disclosed, comprising: a processor; a Wi-Fi portion coupled to the processor; and a Long Term Evolution (LTE) portion coupled to the processor, the processor configured to perform steps comprising: broadcasting at least one Wi-Fi network identifier for a Wi-Fi network from the Wi-Fi portion; mapping a Wi-Fi network identifier for a received data packet to a quality value in a datagram header; assigning, subsequently and using the quality value in the datagram header, an appropriate data bearer for the datagram, the data bearer having a quality of service class identifier (QCI) for the type of traffic expected to be sent over a particular Wi-Fi network associated with the Wi-Fi network identifier; and forwarding the datagram over a tunnel to a Long Term Evolution (LTE) core network via the LTE portion, thereby assigning a quality of service for the datagram in the LTE core network corresponding to the expected type of traffic in the Wi-Fi network.

The quality of service class identifier may be a Long Term Evolution (LTE) quality of service class identifier (QCI), wherein the Wi-Fi network identifier may be a Wi-Fi service set identifier (SSID), wherein the Wi-Fi network may be a Wi-Fi access network for providing access to at least one user device, wherein the quality value may be stored in the datagram header as an Internet Protocol (IP) protocol type of service (TOS) header, and wherein the tunnel may be one of an evolved packet system (EPS) bearer, a point-to-point connection, a global packet radio system tunneling protocol (GTP) tunnel, or an IPsec tunnel. The processor may be further configured to apply a mapping from a set of Wi-Fi network identifiers to a set of quality values, using a mapping table at the base station. The Wi-Fi portion comprises a radio interface for communicating via a Wi-Fi protocol and the LTE portion comprises a radio interface for communicating via an LTE protocol. The Wi-Fi network identifier may be received at the Wi-Fi portion of the base station. The datagram may be forwarded using the LTE portion of the base station. The base station may be a mobile base station using wireless backhaul. The Wi-Fi portion uses at least two service set identifiers (SSIDs), and a first SSID of the at least two SSIDs may be a public SSID for general use by users of the base station, and a second SSID of the at least two SSIDs may be a private SSID for use by a base station operator. The mapping table may be shared among multiple base stations, and further comprising a coordinating server for updating the mapping table. The received data packet may be encrypted. A second base station may also be provided that may be configured to broadcast the same at least two SSIDs and wherein the SSIDs are used for mapping to the quality value in the datagram header at the second base station.

In a second embodiment, a method may be disclosed, comprising: broadcasting at least one Wi-Fi network identifier for a Wi-Fi network; mapping a Wi-Fi network identifier for a received data packet to a quality value in a datagram header; assigning, subsequently and using the quality value in the datagram header, an appropriate data bearer for the datagram, the data bearer having a quality of service class identifier (QCI) for the type of traffic expected to be sent over a particular Wi-Fi network associated with the Wi-Fi network identifier; and forwarding the datagram over a tunnel to a Long Term Evolution (LTE) core network, thereby assigning a quality of service for the datagram in the LTE core network corresponding to the expected type of traffic in the Wi-Fi network.

The method may further include applying a mapping from a set of Wi-Fi network identifiers to a set of quality values, using a mapping table at the base station. The mapping table may be shared among multiple base stations and may be capable of being updated by a coordinating server. The quality of service class identifier may be a Long Term Evolution (LTE) quality of service class identifier (QCI). The Wi-Fi network identifier may be a Wi-Fi service set identifier (SSID). The Wi-fi network may be a Wi-Fi access network for providing access to at least one user device The quality value may be stored in the datagram header as an Internet Protocol (IP) protocol type of service (TOS) header. The tunnel may be one of an evolved packet system (EPS) bearer, a point-to-point connection, a global packet radio system tunneling protocol (GTP) tunnel, or an IPsec tunnel. The received data packet may be encrypted. The method may further include establishing a first evolved packet system (EPS) bearer and a second EPS bearer, the first EPS bearer having a higher priority quality of service class identifier (QCI) than the second EPS bearer. The method may further include forwarding higher-priority datagrams over the first EPS bearer and forwarding lower-priority datagrams over the second EPS bearer, based on a corresponding Wi-Fi network identifier for each datagram as received. The first EPS bearer may be a dedicated bearer and the second EPS bearer may be a default bearer. The first EPS bearer may be configured to be used for a range of QCI values. The method may further include mapping different Wi-Fi service set identifiers (SSIDs) to different evolved packet system (EPS) bearers, different evolved universal mobile telecommunications system terrestrial radio access network (EUTRAN) radio access bearers (e-RABs), or different packet data protocol (PDP) contexts.

DETAILED DESCRIPTION

A solution is described that leverages bridging base stations having both Wi-Fi and cellular connectivity. For datagrams received at a Wi-Fi access point module within the base station, SSID information is available. This SSID information may be used to create a mapping to an appropriate level of quality of service.

Figure 1:
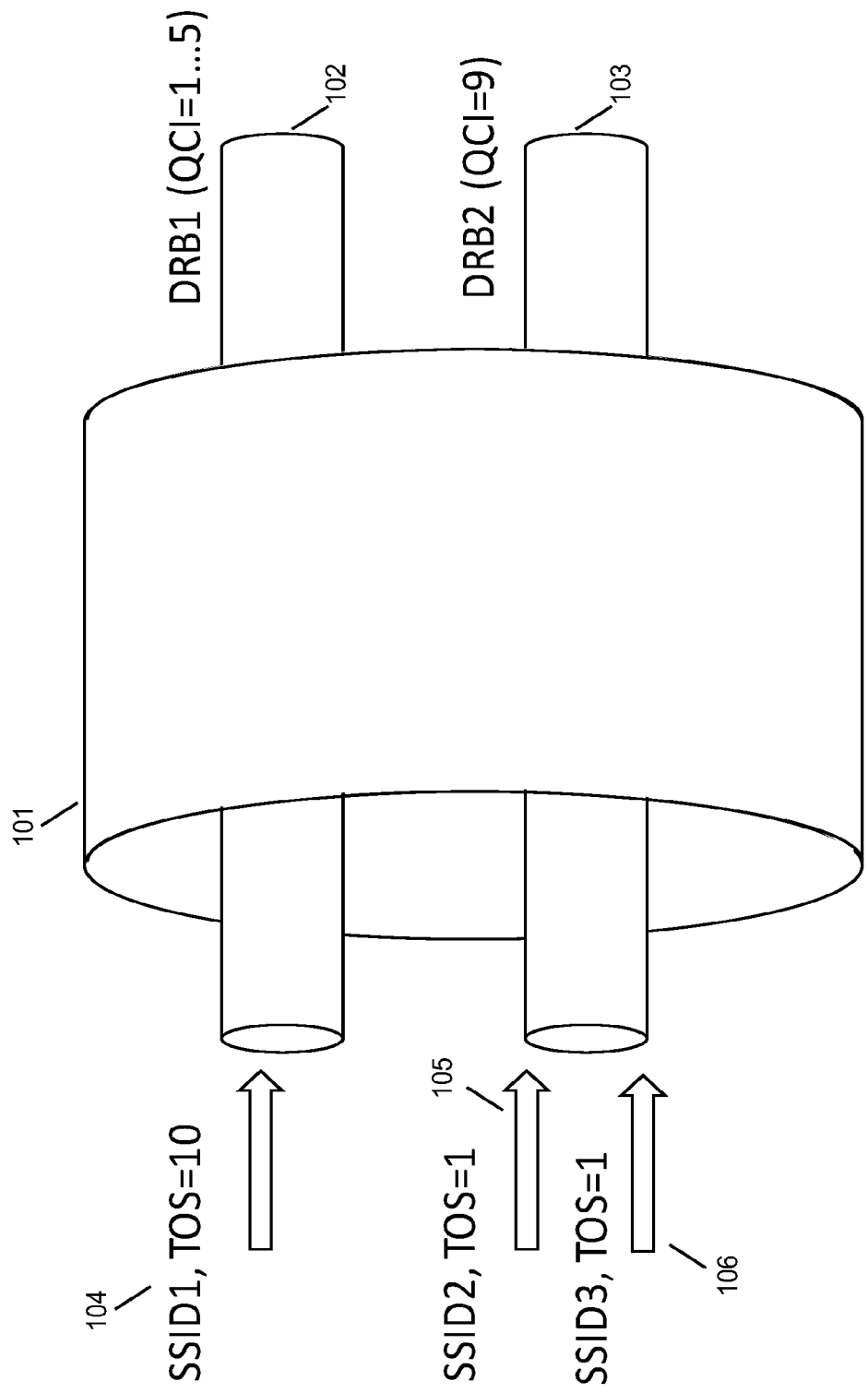
FIG. 1 is a schematic diagram showing tunnel setup in accordance with some embodiments.

FIG. 1 is a schematic diagram showing tunnel setup in accordance with some embodiments. In the following example, a base station is physically located on a bus (or, more generally, is a mobile base station, although a fixed base station could also be equipped with this solution). The bus is in motion and may connect to a macro cell for LTE cellular backhaul. The base station may include a Wi-Fi portion and an LTE portion. Such a base station is described in detail in US20150078167, which is hereby incorporated in its entirety for all purposes. The base station may include a mapping table and mapping and routing logic. The base station is a multi-radio access technology (multi-RAT) node, and has the ability to route packets and data among each of its network interfaces (i.e., it is a router and gateway for its interfaces).

As shown in FIG. 1, a Wi-Fi portion of the base station may broadcast using three SSIDs, shown as SSID1 104, SSID2 105, and SSID3 106. The first SSID may be a "Bus User" SSID, available for any person on the bus to use. The second and third SSIDs may be private SSIDs, available only to devices that have been appropriately configured with access privileges, such as operator-installed equipment. The SSIDs may be broadcast from more than one Wi-Fi base station. The SSIDs may or may not be associated with type of service (TOS) fields within each packet in the IP headers of the datagrams thereof. In the example shown, SSID1 packets may be configured with a TOS of 10 and SSID2 packets may be configured with a TOS of 1. These TOS values may be applied by the base station by mapping the incoming SSID to an appropriate TOS value and applying this TOS value to the incoming data packets. Any number of SSIDs may be mapped, and any number of SSIDs may be configured that is consistent with the IEEE 802.11 standard. Each base station may be configured with a mapping for each of the SSIDs that it broadcasts.

All data received by the base station, including all data received over SSIDs 104, 105, and 106, is routed through a tunnel 101, which is a backhaul connection provided by an LTE connection to a cellular network. The backhaul connection is a single standard LTE connection. As part of the backhaul connection, EPS bearer DRB1 102 and EPS bearer DRB2 103 are set up. EPS bearer 102 is a dedicated bearer and is used by the base station for traffic with priority QCIs 1-5. EPS bearer 103 is a default bearer and supports QCI 9, e.g., best effort.

Suppose SSID 104 is a priority SSID, such as an SSID used by operator owned and operated devices within the bus to communicate to a control server within the network. Data received over SSID 104 is routed to EPS bearer DRB1 102, and thus experiences priority treatment when it is transmitted to the LTE network via the LTE backhaul connection. Data received over SSIDs 105 and 106 is routed to the default bearer, EPS bearer DRB2 103, and is not given priority treatment over the LTE backhaul connection.

As a side effect, data that is transported via either DRB1 or DRB2 that is further de-encapsulated at a packet data network gateway (PGW) and sent over the public Internet is sent with an associated TOS value assigned by the base station. Although the bearer and QCI information is stripped, the TOS value may reflect the content of the data and may provide quality of service-based priority treatment at, e.g., routers on the public Internet or in an operator network. This effect is achieved without additional operations being performed within the network, as the TOS values have been applied at the base station.

It is noted that Wi-Fi frames received at a Wi-Fi access point all have an associated SSID, even frames containing encrypted data, as the SSID is part of the frame envelope and not in the data portion, providing the advantageous characteristic that decryption is not required to determine a QoS from the frame.

Figure 2:
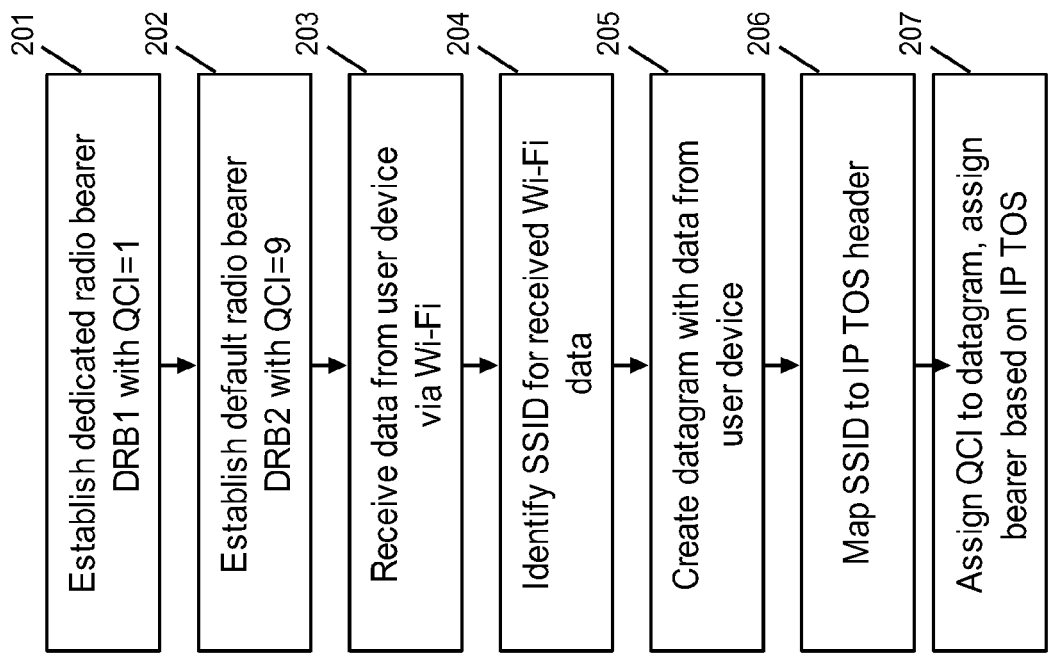
FIG. 2 is a flowchart of an exemplary method, in accordance with some embodiments.

FIG. 2 is a flowchart of an exemplary method, in accordance with some embodiments. After receiving an IP address from a packet gateway, the LTE portion may establish a first data radio bearer DRB1 at step 201 and a second radio bearer DRB2 at step 202, which may be EPS bearers. DRB1 may be established with QCI 1, having a high priority appropriate for, e.g., a voice call. DRB2 may be established with QCI 9, having a best-effort priority. Ranges may be supported, such that, e.g., DRB1 may be used for traffic for QCI's ranging from 1 to 5 and DRB2 may be used for traffic with QCI of 9 (best effort). DRB1 may be a dedicated EPS bearer. DRB2 may be a default EPS bearer.

At step 203, a transmission may arrive from a user device, such as a UE or a laptop, at the Wi-Fi portion to be routed to the public Internet using the LTE portion as backhaul. At the Wi-Fi portion, at step 204, the base station is able to identify the SSID being used by the user device to send the transmission. The base station may take the data part of the transmission and route it to the LTE portion as a new datagram, at step 205. However, the SSID may be accessed by the base station, and mapped via the mapping table to an internal quality of service parameter at step 206. The internal quality of service parameter may be stored in the TOS field in the IP header of the new datagram, as defined in RFC 791, which is incorporated herein in its entirety for all purposes. At step 207, the LTE portion may then consult the IP TOS field, to assign the QCI level and to determine whether the new datagram should be sent via DRB1 or DRB2. In the example scenario, regular transmissions received via the "Bus User" SSID should be sent via DRB2, while transmissions received via the other two SSIDs should be sent via DRB1.

In some embodiments, different SSIDs may be mapped to different bearers, each with a different IP address and/or QCI setting. In other embodiments, different SSIDs may be mapped to different eRABs within one connection (one IP address), with each eRAB set with an individual QCI setting. In some embodiments, more than two bearers or PDP contexts may be set up and mapped to SSIDs. In some embodiments, one SSID may be routed to a default bearer and all other SSIDs may be routed to a non-default bearer, using TOS and QCI.

In some embodiments, a mapping table may be present in the routing layer of one or more nodes, including the base station that is creating the Wi-Fi networks and creating the bearers. The mapping table may be used at a Layer 2 routing layer. The mapping table may be shared with other nodes and/or with a coordinating server. The mapping table may be dynamic, and may support changing the mapping even if the underlying SSIDs and/or RABs or their service levels are not changed. The mapping table or mapping logic may be changed from a remote configuration server or coordinating server. The mapping logic may receive the SSID as an input and may output an appropriate TOS.

In some embodiments, the SSID of an inbound data frame may be used as merely one of several factors in determining QoS, such as traffic type, application data type, deep packet inspection, shallow packet inspection, MAC address, international mobile subscriber identity (IMSI) or other user identity, or other parameters. The mapping table and mapping logic may incorporate more than one of these factors.

In some embodiments, access technologies other than LTE, such as 3G/UMTS, may be supported. In place of the EPS bearers described above, after receiving an IP address, a plurality of PDP contexts may be established by the user equipment, with different PDP contexts having different QoS characteristics. A primary PDP context and secondary PDP context may be established after attach. The primary PDP context may be mapped to a best-effort QCI SSID and the secondary PDP context may be mapped to a high-priority QCI SSID, to provide the advantages described above. PDP contexts may be used in place of EPS bearers wherever so described above. The same methods could be used with any connection providing an IP address or host identifier, in conjunction with one or more tunnels with associated QoS, the one or more tunnels taking the place of an EPS bearer. Examples of such tunnels could include a point-to-point connection, a PPP connection, a GTP tunnel, or an IPSEC tunnel. Types of tunnels could be mixed, in some embodiments. In some embodiments, security could be provided by encrypting all communications to and from a particular IP address, thus providing security for all traffic through all tunnels with all levels of service.

In some embodiments, a wireless medium access control (MAC) address, an extended basic service set ID (ESSID), basic service set identifier (BSSID), ad-hoc network generated address, or wireless access point MAC address may be used instead of an SSID. In some embodiments, another MAC-based parameter that appears in one or more wireless data frames may be used in place of the SSID.

It is noted that if a user equipment (UE) is connected to the multi-RAT base station via an LTE access network at the base station, instead of via Wi-Fi, no SSID will be available, but the UE may already identify an appropriate QCI for its communications, which may be used to select an appropriate bearer at the base station for purposes of LTE backhaul bearer selection.

Figure 3:
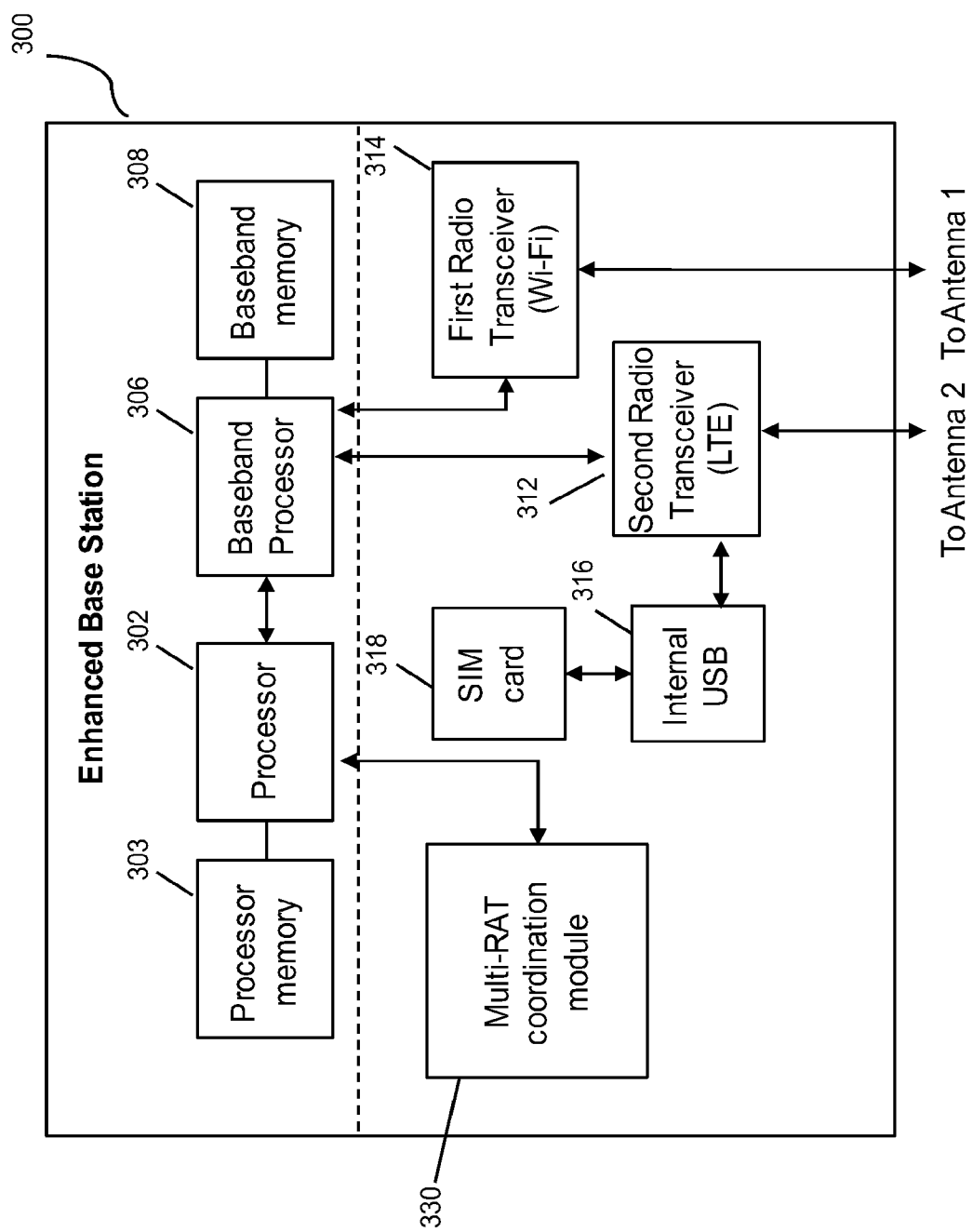
FIG. 3 is a schematic diagram of an enhanced base station, in accordance with some embodiments.

FIG. 3 is a schematic diagram of an enhanced base station, in accordance with some embodiments. Enhanced base station 300 may be an eNodeB for use with LTE, and may include processor 302, processor memory 304 in communication with the processor, baseband processor 306, and baseband processor memory 308 in communication with the baseband processor. Enhanced eNodeB 300 may also include first radio transceiver 314, which is a Wi-Fi transceiver, and second radio transceiver 312, which is an LTE transceiver; enhanced eNodeB 300 is thus a multi-radio access technology (multi-RAT) node. Enhanced eNodeB 300 may also include internal universal serial bus (USB) port 316, and subscriber information module card (SIM card) 318 coupled to USB port 316. In some embodiments, the second radio transceiver 312 itself may be coupled to USB port 316, and communications from the baseband processor may be passed through USB port 316. Transceiver 314 is connected to Antenna 1, which provides Wi-Fi antenna functionality, and transceiver 312 is connected to Antenna 2, which provides LTE transmit and receive antenna functionality. Wi-Fi radio transceiver 314 may provide, e.g., IEEE 802.11a/b/g/n/ac functionality or other Wi-Fi functionality. In some embodiments, Wi-Fi transceiver and Antenna 1 may provide multiple-in, multiple-out (MIMO) functionality. LTE transceiver 312 may be a user equipment (UE) modem. In other embodiments, a UE modem may be connected via a USB bus.

Processor 302 and baseband processor 306 are in communication with one another. Processor 302 may perform routing functions, and may determine if/when a switch in network configuration is needed. Baseband processor 306 may generate and receive radio signals for both radio transceivers 312 and 314, based on instructions from processor 302. In some embodiments, processors 302 and 306 may be on the same physical logic board. In other embodiments, they may be on separate logic boards.

Either transceiver may be coupled to processor 302 via a Peripheral Component Interconnect-Express (PCI-E) bus, and/or via a daughtercard. As transceiver 312 is for providing LTE UE functionality, in effect emulating a user equipment, it may be connected via the same or different PCI-E bus, or by a USB bus, and may also be coupled to SIM card 318.

SIM card 318 may provide information required for authenticating the simulated UE to the evolved packet core (EPC). When no access to an operator EPC is available, local EPC 320 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 300 is not an ordinary UE but instead is a special UE for providing backhaul to device 300.

In some embodiments, wireless radio coverage (i.e., access) to user devices may be provided via Wi-Fi radio transceiver 314. In some embodiments, an additional radio transceiver capable of providing LTE eNodeB functionality (not shown) may be provided, and may be capable of higher power and multi-channel OFDMA for providing access. Processor 302 may be configured to provide eNodeB, nodeB, BTS, base station, access point, and/or other functionality.

Wireless backhaul or wired backhaul may be used. Wired backhaul may be an Ethernet-based backhaul (including Gigabit Ethernet), or a fiber-optic backhaul connection, or a cable-based backhaul connection, in some embodiments. Wireless backhaul may be provided using an LTE connection, using LTE UE modem 312. Additionally, wireless backhaul may be provided in addition to wireless transceivers 310 and 312, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 302 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may execute on the general purpose processor 302.

Processor 302 may identify the appropriate network configuration, and may perform routing of packets from one network interface to another accordingly. Processor 302 may use memory 304, in particular to store a routing table to be used for routing packets. Baseband processor 306 may perform operations to generate the radio frequency signals for transmission or retransmission by both transceivers 310 and 312. Baseband processor 306 may also perform operations to decode signals received by transceivers 310 and 312. Baseband processor 306 may use memory 308 to perform these tasks.

Figure 4:
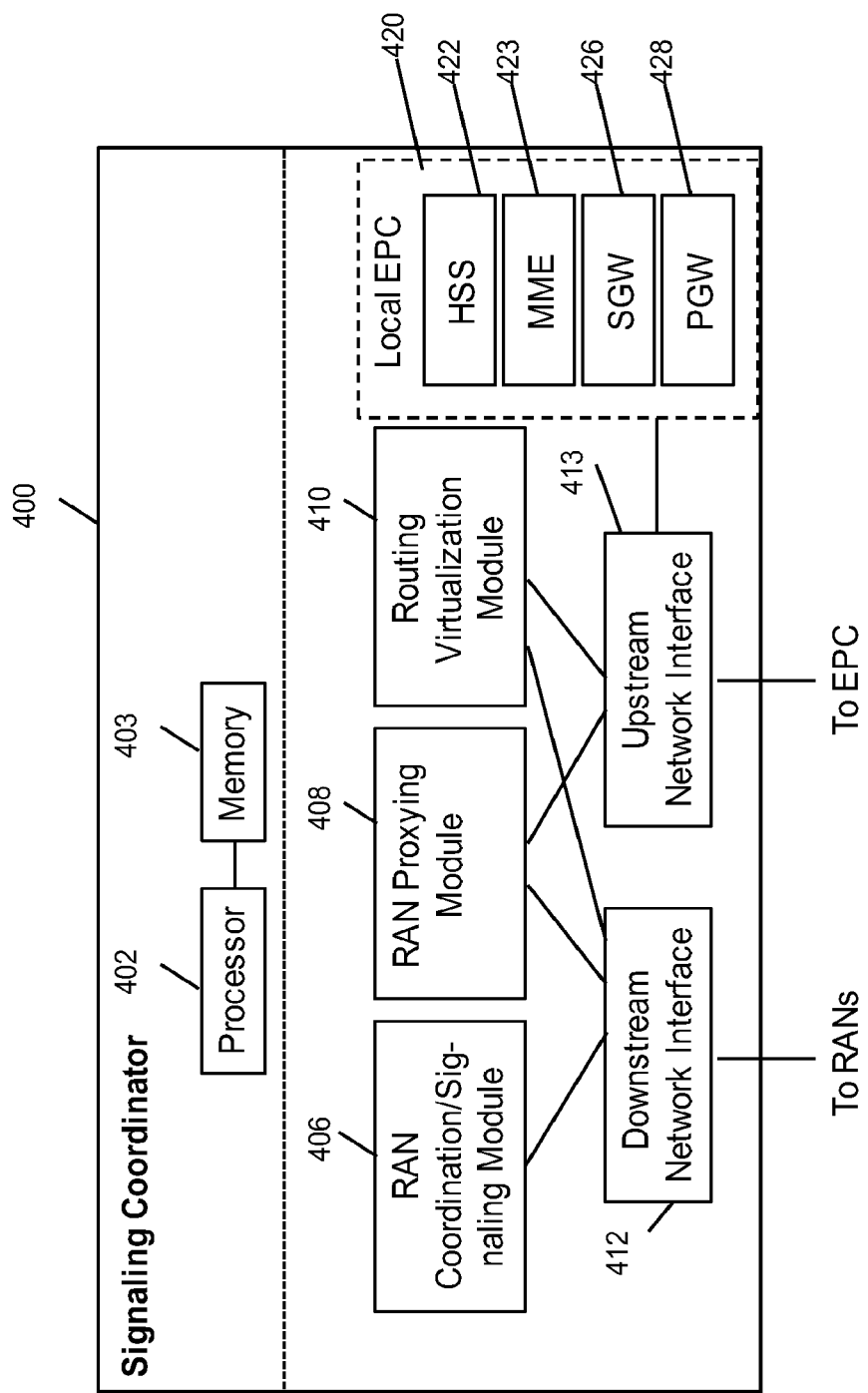
FIG. 4 is a schematic diagram of a signaling coordinator server, in accordance with some embodiments.

FIG. 4 is a schematic diagram of a signaling coordinator server, in accordance with some embodiments. Signaling coordinator 400 includes processor 402 and memory 404, which are configured to provide the functions described herein. Also present are radio access network coordination/signaling (RAN Coordination and signaling) module 406, RAN proxying module 408, and routing virtualization module 410. In some embodiments, coordinator server 400 may coordinate multiple RANs using coordination module 406. In some embodiments, coordination server may also provide proxying, routing virtualization and RAN virtualization, via modules 410 and 408. In some embodiments, a downstream network interface 412 is provided for interfacing with the RANs, which may be a radio interface (e.g., LTE), and an upstream network interface 414 is provided for interfacing with the core network, which may be either a radio interface (e.g., LTE) or a wired interface (e.g., Ethernet). Signaling storm reduction functions may be performed in module 406.

Signaling coordinator 400 includes local evolved packet core (EPC) module 420, for authenticating users, storing and caching priority profile information, and performing other EPC-dependent functions when no backhaul link is available. Local EPC 420 may include local HSS 422, local MME 424, local SGW 426, and local PGW 428, as well as other modules. Local EPC 420 may incorporate these modules as software modules, processes, or containers. Local EPC 420 may alternatively incorporate these modules as a small number of monolithic software processes. Modules 406, 408, 410 and local EPC 420 may each run on processor 402 or on another processor, or may be located within another device.

Signaling coordinator 400 may be a pass-through gateway for data tunnels, forwarding data through to a core network. Signaling coordinator 400 may also provide encryption functions, e.g., using IPsec for encrypting or decrypting data for forwarding over one or more bearers to the core network. In the case that Wi-Fi is used at one or more base stations to provide access to user devices, the signaling coordinator may be a trusted wireless access gateway (TWAG) or evolved packet data gateway (ePDG), providing the ability for the Wi-Fi user devices to participate in and join the operator network. In some cases, signaling coordinator 400 may be a home eNodeB gateway (HENBGW). Because the built-in QCI and TOS mechanisms used by the methods described herein are passed through by IPsec, GTP-U, and other tunneling protocols, these quality of service (QOS) parameters are preserved by the signaling coordinator 400.

Figure 5:
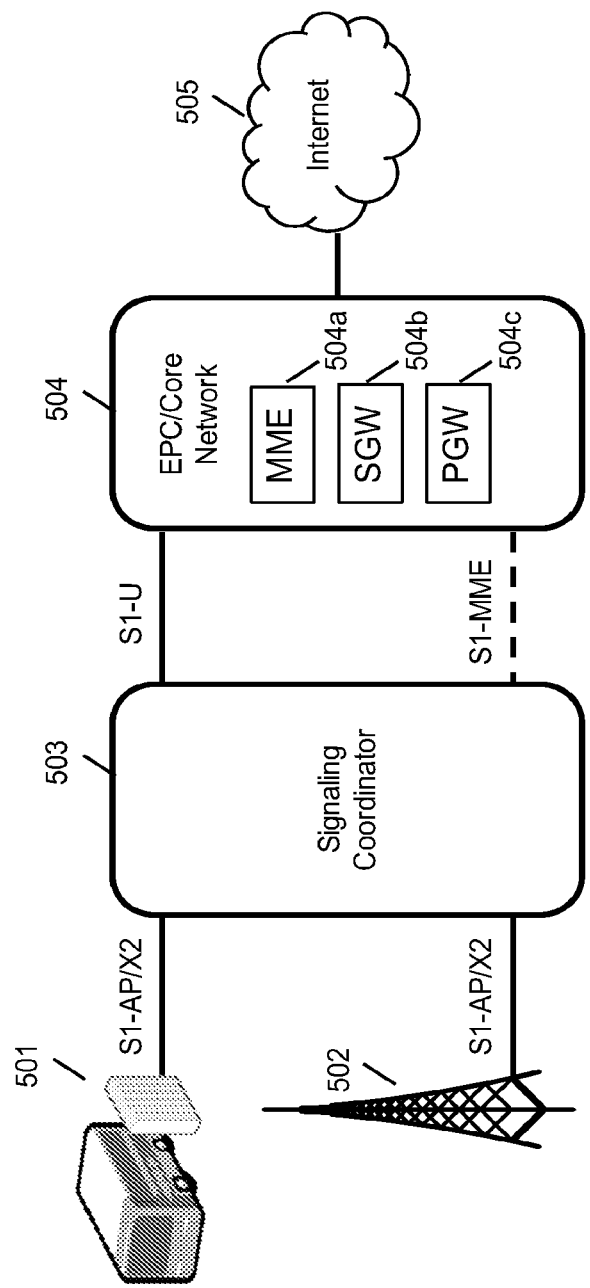
FIG. 5 is a system architecture diagram of an exemplary network configuration, in accordance with some embodiments.

FIG. 5 is a system architecture diagram of an exemplary network configuration, in accordance with some embodiments. Base stations 501 and 502 are connected via an S1-AP and an X2 interface to signaling coordinator 503. Base stations 501 and 502 are eNodeBs, in some embodiments. Base station 501 is a mobile base station located on a bus, and is connected via wireless LTE backhaul. Base station 502 is a fixed base station connected via wired backhaul. Signaling coordinator 503, which may be the same as described earlier in FIG. 4 as signaling coordinator 400, is connected to the evolved packet core (EPC)/Core Network 508 via an S1 protocol connection and an S1-MME protocol connection. Coordination of base stations 502 and 504 may be performed at the coordination server. In some embodiments, the coordination server may be located within the EPC/Core Network 508. EPC/Core Network 508 provides various LTE core network functions, such as authentication, data routing, charging, and other functions, and includes mobility management entity (MME) 504a, serving gateway (SGW) 504b, and packet data network gateway (PGW) 504c. In some embodiments, mobility management is performed both by coordination server 506 and within the EPC/Core Network 508. EPC/Core Network 508 provides, typically through PGW 504c, a connection to the public Internet 510.

In operation, data is received at, e.g., a Wi-Fi access point that is part of base station 501, which is a multi-RAT base station. The data is assigned a TOS and an LTE bearer, and the data is sent via signaling coordinator 503 to core network 504. The data is encapsulated in a bearer at base station 501 and un-encapsulated from the bearer at the core network 504, and experiences quality of service prioritization within the network. If the data is forwarded on from the core network to the Internet 505, TOS is preserved.

While a signaling coordinator 503 is shown in this embodiment, the described method may be used without a signaling coordinator, e.g., in a standard LTE core network where eNodeBs are connected directly to an operator core network. Alternatively, in some embodiments, the functions and steps described herein may be split among the eNodeB/multi-RAT node 501 and signaling coordinator 503, so that the Wi-Fi SSID may be assigned to a TOS at base station 501 or at a Wi-Fi femto cell, but not used for QoS until reaching a coordinating node 503.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the Wi-Fi frequency bands described herein may be channels determined by the respective IEEE 802.11 protocols, which are incorporated herein to the maximum extent permitted by law. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment. Those of skill in the art will recognize that small cells, macro cells, wireless access points, femto gateways, etc. may all benefit from the methods described herein.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods for providing interference mitigation are described in reference to the Long Term Evolution (LTE) standard, one of skill in the art would understand that these systems and methods may be adapted for use with other wireless standards or versions thereof.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. For example, both EPS bearers and PDP contexts may be supported in one mapping table by a combined embodiment. Other embodiments are within the following claims.

The invention claimed is:

1. A multi-radio access technology (multi-RAT) base station, comprising:
   a processor;
   a Wi-Fi portion coupled to the processor; and
   a network portion coupled to the processor, the processor configured to perform steps comprising:
   broadcasting at least one Wi-Fi network identifier for a Wi-Fi network from the Wi-Fi portion;
   mapping a Wi-Fi network identifier for a received data packet to a quality value in a datagram header;
   assigning, subsequently and using the quality value in the datagram header, an appropriate data bearer for the datagram, the data bearer having a quality of service class identifier (QCI) for the type of traffic expected to be sent over a particular Wi-Fi network associated with the Wi-Fi network identifier;
   establishing a first evolved packet system (EPS) bearer and a second EPS bearer, the first EPS bearer having a higher priority QCI than the second EPS bearer; and
   forwarding higher-priority datagrams over the first EPS bearer and forwarding lower-priority datagrams over the second EPS bearer, over a tunnel to a core network via the network-portion, based on a corresponding Wi-Fi network identifier for each datagram as received,
   thereby assigning a quality of service for the datagram in the core network corresponding to the expected type of traffic in the Wi-Fi network and
   wherein the base station is part of a multi-RAT network.

2. The base station of claim 1, wherein the Wi-Fi network identifier is a Wi-Fi service set identifier (SSID), wherein the Wi-Fi network is a Wi-Fi access network for providing access to at least one user device, wherein the quality value is stored in the datagram header as an Internet Protocol (IP) protocol type of service (TOS) header, and wherein the tunnel is one of an evolved packet system (EPS) bearer, a point-to-point connection, a global packet radio system tunneling protocol (GTP) tunnel, or an IPsec tunnel.

3. The base station of claim 1, wherein the processor is further configured to apply a mapping from a set of Wi-Fi network identifiers to a set of quality values, using a mapping table at the base station.

4. The base station of claim 1, wherein the Wi-Fi portion comprises a radio interface for communicating via a Wi-Fi protocol and the network portion comprises a radio interface for communicating via a network protocol.

5. The base station of claim 1, wherein the Wi-Fi network identifier is received at the Wi-Fi portion of the base station.

6. The base station of claim 1, wherein the datagram is forwarded using the network portion of the base station.

7. The base station of claim 1, wherein the base station is a mobile base station using wireless backhaul.

8. The base station of claim 1, wherein the Wi-Fi portion uses at least two service set identifiers (SSIDs), and a first SSID of the at least two SSIDs is a public SSID for general use by users of the base station, and a second SSID of the at least two SSIDs is a private SSID for use by a base station operator.

9. The base station of claim 1, wherein the mapping table is shared among multiple base stations, and further comprising a coordinating server for updating the mapping table.

10. The base station of claim 1, wherein the received data packet is encrypted.

11. The base station of claim 1, further comprising a connection to a second base station configured to broadcast the same at least two SSIDs and wherein the SSIDs are used for mapping to the quality value in the datagram header at the second base station.

12. A method, comprising:
    broadcasting, in a network including a multi-radio access technology (multi-RAT) base station, at least one Wi-Fi network identifier for a Wi-Fi network;
    mapping a Wi-Fi network identifier for a received data packet to a quality value in a datagram header;
    assigning, subsequently and using the quality value in the datagram header, an appropriate data bearer for the datagram, the data bearer having a quality of service class identifier (QCI) for the type of traffic expected to be sent over a particular Wi-Fi network associated with the Wi-Fi network identifier;
    establishing a first evolved packet system (EPS) bearer and a second EPS bearer, the first EPS bearer having a higher priority quality of service class identifier (QCI) than the second EPS bearer; and
    forwarding higher-priority datagrams over the first EPS bearer and forwarding lower-priority datagrams over the second EPS bearer, over a tunnel to a-core network, based on a corresponding Wi-Fi network identifier for each datagram as received, thereby assigning a quality of service for the datagram in the core network corresponding to the expected type of traffic in the Wi-Fi network.

13. The method of claim 12, further comprising applying a mapping from a set of Wi-Fi network identifiers to a set of quality values, using a mapping table at the base station.

14. The method of claim 12, wherein the mapping table is shared among multiple base stations and is capable of being updated by a coordinating server.

15. The method of claim 12, wherein the quality of service class identifier is a network quality of service class identifier (QCI).

16. The method of claim 12, wherein the Wi-Fi network identifier is a Wi-Fi service set identifier (SSID).

17. The method of claim 12, wherein the Wi-Fi network is a Wi-Fi access network for providing access to at least one user device.

18. The method of claim 12, wherein the quality value is stored in the datagram header as an Internet Protocol (IP) protocol type of service (TOS) header.

19. The method of claim 12, wherein the tunnel is one of an evolved packet system (EPS) bearer, a point-to-point connection, a global packet radio system tunneling protocol (GTP) tunnel, or an IPsec tunnel.

20. The method of claim 12, wherein the received data packet is encrypted.

* * * * *